United States Patent
Wang et al.

(10) Patent No.: US 12,378,413 B2
(45) Date of Patent: Aug. 5, 2025

(54) SILICONE ELASTOMER COMPOSITIONS AND ELASTOMERIC MATERIALS

(71) Applicant: DOW SILICONES CORPORATION, Midland, MI (US)

(72) Inventors: Shaohui Wang, Shanghai (CN); Yusheng Chen, Shanghai (CN); Rui Wang, Shanghai (CN); Hans Peter Wolf, Schierstein (DE); Mark D. Fisher, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 843 days.

(21) Appl. No.: 17/442,670

(22) PCT Filed: Mar. 29, 2019

(86) PCT No.: PCT/CN2019/080316
§ 371 (c)(1),
(2) Date: Sep. 24, 2021

(87) PCT Pub. No.: WO2020/198905
PCT Pub. Date: Oct. 8, 2020

(65) Prior Publication Data
US 2022/0169856 A1   Jun. 2, 2022

(51) Int. Cl.
| C08G 77/08 | (2006.01) |
| C08G 77/12 | (2006.01) |
| C08G 77/20 | (2006.01) |
| C08G 77/24 | (2006.01) |
| C08K 3/36 | (2006.01) |
| C08K 5/14 | (2006.01) |
| C08K 9/00 | (2006.01) |
| C08L 27/18 | (2006.01) |
| C08L 83/04 | (2006.01) |

(52) U.S. Cl.
CPC .............. *C08L 83/04* (2013.01); *C08G 77/08* (2013.01); *C08G 77/12* (2013.01); *C08G 77/20* (2013.01); *C08G 77/24* (2013.01); *C08K 3/36* (2013.01); *C08K 5/14* (2013.01); *C08K 9/00* (2013.01); *C08L 27/18* (2013.01); *C08L 2205/025* (2013.01); *C08L 2205/03* (2013.01)

(58) Field of Classification Search
CPC ......... C08G 77/20; C08L 83/04; C08L 27/18; C08K 3/36
See application file for complete search history.

(56) References Cited

U.S. PATENT DOCUMENTS

| 4,010,136 A * | 3/1977 | Blizzard .................. C08L 83/04 260/37 SB |
| 4,732,931 A * | 3/1988 | Maxson .................. C08G 77/06 528/32 |
| 4,753,978 A * | 6/1988 | Jensen .................... C08L 83/04 524/862 |
| 5,364,921 A | 11/1994 | Gray et al. |
| 5,583,170 A | 12/1996 | Wrobel |
| 5,989,719 A | 11/1999 | Loiselle |
| 2003/0109623 A1* | 6/2003 | Gornowicz .............. C08K 3/34 524/492 |
| 2006/0258819 A1 | 11/2006 | Woerner |
| 2008/0200609 A1 | 8/2008 | Woerner et al. |
| 2010/0055449 A1 | 3/2010 | Ota |

FOREIGN PATENT DOCUMENTS

| CN | 1869126 A | 11/2006 |
| CN | 101245188 A | 8/2008 |
| CN | 101616795 A | 12/2009 |
| CN | 105838083 A | 8/2016 |
| EP | 0695787 A2 | 2/1996 |
| EP | 0826733 A2 | 3/1998 |
| EP | 0520777 B1 | 6/1998 |
| EP | 1233014 * | 8/2002 ........... C07C 409/32 |
| JP | H0565414 A | 3/1993 |
| KR | 101926588 B1 | 12/2018 |

OTHER PUBLICATIONS

Vinyl content-viscosity chart (Year: 2021).*
PTFE powder particle size (Year: 2024).*
International Search Report for PCT/CN2019/080316 dated Dec. 30, 2019, 3 pages.
Machine assisted English translation of CN105838083A obtained from https://patents.google.com/patent on Oct. 28, 2021, 11 pages.
Machine assisted English translation of JPH0565414A obtained from https://worldwide.espacenet.com/patent on Jun. 7, 2024, 14 pages.
Machine assisted English translation of KR101926588B1 obtained from https://worldwide.espacenet.com/patent on Jun. 7, 2024, 31 pages.

* cited by examiner

*Primary Examiner* — Catherine S Branch
*Assistant Examiner* — Huihong Qiao
(74) *Attorney, Agent, or Firm* — Warner Norcross + Judd LLP

(57) ABSTRACT

Provided herein is a self-lubricating silicone elastomer composition and a self-lubricating, elastomeric material made therefrom which has a low coefficient of friction and avoids the need for "self-bleeding". The self-lubricating silicone elastomer composition comprises: (i) 50 to 75% by weight of one or more polydiorganosiloxane polymer(s) containing from 0.01 to 0.1% by weight of alkenyl and/or alkynyl content; (ii) 3 to 15% by weight of a polydiorganosiloxane polymer having ≥0.5% by weight of alkenyl or alkynyl content; (iii) 10 to 35% by weight of reinforcing filler; and either or both of (iv) a peroxide catalyst; or (v) a hydrosilylation catalyst package.

20 Claims, No Drawings

SILICONE ELASTOMER COMPOSITIONS AND ELASTOMERIC MATERIALS

This application is the U.S. National Stage of, and claims priority to and all advantages of, International Application No. PCT/CN2019/080316 filed on 29 Mar. 2019, the content of which is incorporated herein by reference.

The present invention relates to a self-lubricating silicone elastomer composition and a self-lubricating, elastomeric material made therefrom which has a low coefficient of friction and avoids the need for "self-bleeding". Also disclosed are articles made from the elastomeric material.

Silicone elastomer compositions which cross-link by addition (sometimes referred to as hydrosilylation) cure or peroxide radical cure are known in the field of silicone rubber. Because of the physical properties of elastomers resulting therefrom, they can be used in a wide range of applications. For many uses silicone elastomeric materials (silicone rubbers) are superior to natural rubber. For example, silicone elastomers made using curable polydiorganosiloxane based compositions, can withstand wide temperature variations without an appreciable effect on their physical properties. Furthermore, they are virtually unaffected by ultraviolet radiation, even over long periods of time. They are also resistant to ozone, oil, salt, water and other road and automotive chemicals. However, generally silicone elastomeric materials have the disadvantage of having high coefficients of friction when they come into frictional contact with a variety of other materials.

For example, silicone based elastomeric materials have been utilised as the blade material in wiper blades for vehicle windshields. However, the use of these silicone elastomeric materials for such applications originally proved difficult because of the unacceptably high friction between the silicone elastomeric blade and the windscreen surface. In fact, some early silicone wiper blades exhibited such high levels of friction that the wiper blades tore loose from the wiper frame when wiping the windshield and often also caused unacceptably loud squeaks and/or "juddery" noises during interactions with the windshield surface which resulted in excessively high loads on the windshield wiper motor.

Wiper blades produced using silicone elastomeric materials today are significantly improved because they are made using silicone elastomeric materials having much lower coefficients of friction. This is because self-lubricating silicone elastomers have been developed by e.g. introducing polytetrafluoroethylene (PTFE) powders (typically of a particle size ≥1 and ≤50 μm) into the silicone compositions used to prepare the elastomeric materials, by coating pre-cured silicone elastomer wiper blades with PTFE coatings and through the development of self-bleeding silicone elastomers designed to create lubricious surfaces by bleeding liquid lubricants out from the elastomer body after cure and eliminating the need for the latter secondary coating process. However, whilst the above coatings and self-bleeding silicone elastomer materials can be seen to provide benefits to this application they do not provide a complete solution because the lubricating coatings will wear off over time, thereby reducing the improved frictional characteristics of the wiper blade and using a self-bleeding elastomer as the wiper blade may cause a film to be coated onto the windscreen surface which can obscure a drivers view.

Other applications for self-lubricating silicone elastomeric materials include semi-dynamic seals having two or more parts, where one part moves along, slides over, or contacts another part or element in the practice, or as part of a dynamic seal, where two or more parts similarly contact or move against each other, examples include gaskets, valves, covers and the like. In such applications/uses articles made from said self-lubricating silicone elastomeric materials are provided to effectively reduce friction between rubbing or contact surfaces, most importantly in conditions of boundary lubrication and/or for continuously maintaining a low surface-energy and/or to effectively repel fluids and the resulting drag forces on contact surfaces. They are commonly used in automotive connector seals, for electrical connections, in weather pack seals, as O-rings, valves, stoppers, seals, balloons which can be utilised in certain medical applications, where appropriate. By increasing the lubricity of the elastomeric material used, the degree of deformation can be limited for a particular structure to form or maintain a leak-proof seal, while the force needed to slide over or through the structure is reduced.

Typically such self-lubricating silicone elastomer compositions comprise one or more lubricants, such as synthetic oils and/or solid lubricants. In the case of synthetic oils these may include, for example, perfluoropolyether (PFPE) synthetic oils, polytetrafluoroethylene (PTFE) synthetic oils, and hydrocarbon-based synthetic oils, e.g. namely co-oligomers of ethylene and olefins. Such materials are generally known in the industry as oil-bleeding liquid silicone rubbers which are specifically designed to avoid the need for secondary coating processes to reduce the coefficient of friction. These self-lubricating silicone elastomer compositions are intended to promote longevity of molded parts, prevent slit healing and enable easy and efficient part molding without fouling the mold. Preferred solid lubricants include low particle size (≥1 and ≤50 μm) polytetrafluoroethylene powders, titanium dioxide micro powders, molybdenum disulfide micro powders, graphite micro powders or flakes, and boron nitride micro powders and the like.

However, problems have been identified with the oil bleeding out of the elastomeric materials, the addition of powders resulting in significant viscosity increases in the uncured compositions and evident degradation in mechanical properties after cure.

Manufacturers therefore are continually seeking alternative improved solutions in reducing the coefficient of friction of silicone elastomeric materials and providing compositions which avoid the problems described above.

There is provided herein a self-lubricating silicone elastomer composition comprising
(i) 50 to 75% by weight of one or more polydiorganosiloxane polymer(s) containing from 0.01 to 0.1% by weight of alkenyl and/or alkynyl content;
(ii) 3 to 15% by weight of a polydiorganosiloxane polymer having ≥0.5% by weight of alkenyl or alkynyl content;
(iii) 10 to 35% by weight of reinforcing filler; and either
(iv) a peroxide catalyst; or
(v) a hydrosilylation catalyst package comprising
   a. a polydiorganosiloxane polymer having at least 2, alternatively at least 3 Si—H groups per molecule; and
   b. a hydrosilylation catalyst; or
(vi) a combination of (iv) and (v).

For the avoidance of doubt it is to be understood that in the above and all other references to % weight (% wt.) of the composition in this disclosure, the total % wt. of the composition in all instances is 100%.

There is also provided a self-lubricating silicone elastomeric material which is the cured product of the composition as described herein. In one embodiment said silicone elastomeric material has a post cured kinetic coefficient of friction of >0 and ≤0.8 or has a post cured kinetic coefficient of friction of >0 and ≤1.25 in the case of a fluorosilicone elastomeric material.

There is also provided a device selected from straps and bands of wearable devices, protection covers for mobile phones and other personal electronic devices, catheters, gaskets and/or seals for healthcare applications, wiper blades, connector seals, matt seals, wire seals kitchenware, sanitation articles, insulators and/or arresters for high voltage industry which consists or comprises of a self-lubricating silicone rubber elastomer material as herein described.

There is also provided a method of manufacturing a self-lubricating silicone elastomeric material by mixing the components of the composition as described herein.

There is also provided a use of a self-lubricating silicone elastomeric material as described herein to produce an article selected from straps and bands of wearable devices, protection covers for mobile phones and other personal electronic devices, catheters, gaskets and/or seals for healthcare applications, wiper blades, connector seals, matt seals, wire seals kitchenware, sanitation articles, insulators and/or arresters for high voltage industry which consists or comprises of a self-lubricating silicone rubber elastomer material.

Furthermore there is provided a use of a self-lubricating silicone elastomeric material as described herein as a non-oil bleeding low coefficient of friction elastomeric material.

The self-lubricating silicone elastomer composition is curable to form a self-lubricating silicone elastomeric material. The composition may include one or more optional additives but the total weight % of the composition is 100 wt. %. The alkenyl and/or alkynyl content of polymer (i) is determined using quantitative infra-red analysis in accordance with ASTM E168.

Component (i) of the silicone elastomer composition herein is one or more polydiorganosiloxane polymer(s) containing from 0.01 to 0.1% wt. of alkenyl and/or alkynyl content by weight of component (i). In one embodiment the polydiorganosiloxane polymer(s) of component (i) may be fluorosilicone polymer(s). The polydiorganosiloxane polymer has multiple units of the formula (I):

$$R_aSiO_{(4-a)/2} \quad (I)$$

in which each R is independently selected from an aliphatic hydrocarbyl, aromatic hydrocarbyl, or organyl group (that is any organic substituent group, regardless of functional type, having one free valence at a carbon atom). Saturated aliphatic hydrocarbyls are exemplified by, but not limited to alkyl groups such as methyl, ethyl, propyl, pentyl, octyl, undecyl, and octadecyl and cycloalkyl groups such as cyclohexyl. Unsaturated aliphatic hydrocarbyls are exemplified by, but not limited to, alkenyl groups such as vinyl, allyl, butenyl, pentenyl, cyclohexenyl and hexenyl; and by alkynyl groups. Aromatic hydrocarbon groups are exemplified by, but not limited to, phenyl, tolyl, xylyl, benzyl, styryl, and 2-phenylethyl. Organyl groups are exemplified by, but not limited to, halogenated alkyl groups such as fluoroalkyl groups when a fluorosilicone polymer as discussed in detail below, chloromethyl and 3-chloropropyl; nitrogen containing groups such as amino groups, amido groups, imino groups, imido groups; oxygen containing groups such as polyoxyalkylene groups, carbonyl groups, alkoxy groups and hydroxyl groups. Further organyl groups may include sulfur containing groups, phosphorus containing groups and/or boron containing groups. The subscript "a" may be 0, 1, 2 or 3, but is typically mainly 2 or 3.

Siloxy units may be described by a shorthand (abbreviated) nomenclature, namely—"M," "D," "T," and "Q", when R is a methyl group (further teaching on silicone nomenclature may be found in Walter Noll, Chemistry and Technology of Silicones, dated 1962, Chapter 1, pages 1-9). The M unit corresponds to a siloxy unit where a =3, that is $R_3SO_{1/2}$; the D unit corresponds to a siloxy unit where a=2, namely $R_2SiO_{2/2}$; the T unit corresponds to a siloxy unit where a=1, namely $R_1SiO_{3/2}$; the Q unit corresponds to a siloxy unit where a=0, namely $SiO_{4/2}$.

Examples of typical groups on the polydiorganosiloxane polymer (i) include mainly alkenyl, alkyl, and/or aryl groups. The groups may be in pendent position (on a D or T siloxy unit) or may be terminal (on an M siloxy unit). As previously indicated alkenyl and/or alkynyl groups are essential. Suitable alkenyl and/or alkynyl groups in polydiorganosiloxane polymer (i) typically contain from 2 to 10 carbon atoms, e.g. for alkenyl groups vinyl, isopropenyl, allyl, and 5-hexenyl. It is preferred that the alkenyl or alkynyl groups are alkenyl groups, alternatively vinyl groups.

The silicon-bonded organic groups attached to polydiorganosiloxane polymer (i) other than alkenyl and/or alkynyl radicals are typically selected from monovalent saturated hydrocarbon radicals, which typically contain from 1 to 10 carbon atoms, and monovalent aromatic hydrocarbon radicals, which typically contain from 6 to 12 carbon atoms, which are unsubstituted or substituted with groups that do not interfere with curing of this inventive composition, such as halogen atoms. Preferred species of the silicon-bonded organic groups are, for example, alkyl groups such as methyl, ethyl, and propyl; and aryl groups such as phenyl.

The molecular structure of polydiorganosiloxane polymer (i) is typically linear, however, there can be some branching due to the presence of T units (as previously described) within the molecule.

To achieve a useful level of physical properties in the elastomer prepared by curing the composition as hereinbefore described the viscosity of polydiorganosiloxane polymer (i) should be at least 1000 mPa·s at 25° C. relying on the cup/spindle method of ASTM D 1084 Method B, using the most appropriate spindle from the Brookfield® RV or LV range for the viscosity range. The upper limit for the viscosity of polydiorganosiloxane polymer (i) is not specifically restricted and is typically limited only by processability if liquid silicone rubber (LSR) compositions are desired, alternatively the viscosity of the LSR polymer (i) may go up to 500,000 mPa·s at 25° C. Alternatively, however polydiorganosiloxane (i) may be one or more polydiorganosiloxane gums and/or fluorosilicone polymers or gums.

A polydiorganosiloxane gum typically has a viscosity of at least 1,000,000 mPa·s at 25° C. However, because of the difficulty in measuring viscosity of highly viscous fluids such as silicone gums, the gums tend to be described by way of their Williams plasticity values in accordance with ASTM D-926-08 rather than by viscosity. A polydiorganosiloxane gum (i) has a viscosity resulting in a Williams's plasticity of at least 30 mm/100 measured in accordance with ASTM D-926-08, alternatively at least 50 mm/100 measured in accordance with ASTM D-926-08, alternatively at least 100 mm/100 measured in accordance with ASTM D-926-08, alternatively from 100 mm/100 to 300 mm/100.

The polydiorganosiloxane polymer (i) may be selected from polydimethylsiloxanes, alkylmethylpolysiloxanes, alkylarylpolysiloxanes or copolymers thereof containing e.g. alkenyl and/or alkynyl groups and may have any suitable terminal groups, for example, they may be trialkyl terminated, alkenyldialkyl terminated or may be terminated with any other suitable terminal group combination providing each polymer contains at least two alkenyl or alkynyl groups (usually alkenyl groups) per molecule. Hence the Polydiorganosiloxane polymer (i) may be, for the sake of example, dimethylvinyl terminated polydimethylsiloxane, dimethylvinylsiloxy-terminated dimethylmethylphenylsiloxane, trialkyl terminated dimethylmethylvinyl polysiloxane or dialkylvinyl terminated dimethylmethylvinyl polysiloxane copolymers.

For example, a polydiorganosiloxane polymer (i) containing alkenyl or alkynyl groups at the two terminals may be represented by the general formula (II):

  (II)

In formula (II), each R' may be an alkenyl group or an alkynyl group, alternatively alkenyl groups, which typically contains from 2 to 10 carbon atoms. Alkenyl groups include but are not limited to vinyl, propenyl, butenyl, pentenyl, hexenyl an alkenylated cyclohexyl group, heptenyl, octenyl, nonenyl, decenyl or similar linear and branched alkenyl groups and alkenylated aromatic ringed structures. Alkynyl groups may be selected from but are not limited to ethynyl, propynyl, butynyl, pentynyl, hexynyl an alkynylated cyclohexyl group, heptynyl, octynyl, nonynyl, decynyl or similar linear and branched alkenyl groups and alkenylated aromatic ringed structures.

R" does not contain ethylenic unsaturation, Each R" may be the same or different and is individually selected from monovalent saturated hydrocarbon radical, which typically contain from 1 to 10 carbon atoms, and monovalent aromatic hydrocarbon radical, which typically contain from 6 to 12 carbon atoms. R" may be unsubstituted or substituted with one or more groups that do not interfere with curing of this inventive composition, such as halogen atoms. Alternatively, R" contains 1 to 6 carbon atoms, alternatively R" is a methyl group. R'" is R' or R".

Polydiorganosiloxane polymer (i) may alternatively be a fluorosilicone polymer, i.e. a fluorinated polydiorganosiloxane polymer comprising units having the formula $(R^2Z)_d(R^3)_eSiO_{(4-d-e)/2}$ wherein
each $R^2$ may be the same or different and denotes a branched or linear fluoroalkyl radical having from 1 to 8 carbon atoms;
each Z may be the same or different and denotes a divalent alkylene group containing at least two carbon atoms, a hydrocarbon ether or a hydrocarbon thioether. Each $R^2$ radical is linked to a silicon atom via a Z group,
each $R^3$ is the same or different and denotes an optionally substituted saturated or unsaturated silicon-bonded, monovalent hydrocarbon group,
wherein d=0 to 2, e=0 to 2 and when d is 0 at least one $R^3$ group per unit contains one or more carbon-fluorine bonds.

Examples of suitable saturated $R^3$ radicals include alkyl radicals, such as methyl, ethyl, propyl, isopropyl, butyl, hexyl, 2-ethylhexyl, octyl, isooctyl and decyl. Preferably, when e is >0 at least 90 percent, and more preferably except for alkenyl radicals, all the $R^3$ radicals in the fluorosilicone polymer are methyl radicals. Preferably when d is 0, on average at least one $R^3$ per unit contains at least one carbon-fluorine bond alternatively when e is 0, at least one $R^2$ per unit is $CF_3$—.

Preferably $R^2$ denotes a fluoroalkyl radical having at least one carbon atom, alternatively having from 1 to 8 carbon atoms, over the complete range of from 5 to 100 mol % fluorinated siloxane units. Each fluoroalkyl radical present has at least one —C—F bond. The $R^2$ radicals can be identical or different and can have a normal or a branched structure. Preferably at least some, most preferably at least 50% of the fluoroalkyl groups are perfluoroalkyl groups. Examples thereof include $CF_3$—, $C_2F_5$—, $C_3F_7$—, such as $CF_3CF_2CF_2$— or $(CF_3)_2CF$—, $C_4F_9$—, such as $CF_3CF_2CF_2CF_2$—, $(CF_3)_2CFCF_2$—, $(CF_3)_3C$— and $CF_3CF_2(CF_3)CF$—; $C_5F_{11}$ such as $CF_3CF_2CF_2CF_2CF_2$—, $C_6F_{13}$—, such as $CF_3(CF_2)_4CF_2$—; $C_7F_{14}$—, such as $CF_3(CF_2CF_2)_3$—; and $C_8F_{17}$.

Each perfluoroalkyl radical is bonded to a silicon atom by way of Z, a divalent spacing radical containing carbon, hydrogen and, optionally, oxygen and/or sulphur atoms which are present as ether and thioether linkages, respectively. The sulphur and oxygen atoms, if present, must be bonded to only carbon atoms.

Each Z radical can have any structure containing the elements listed; however, each is preferably an alkylene radical (i.e. an acyclic, branched or unbranched, saturated divalent hydrocarbon group). Examples of suitable alkylene radicals include —$CH_2CH_2$—, —$CH_2CH_2CH_2$—, —$CH(CH_3)CH_2$—, —$(CH_2CH_2)_2$— and —$CH(CH_3)CH_2CH_2$—. In one embodiment each fluorinated radical, $R^2Z$, preferably has the formula $R^2CH_2CH_2$—, i.e. Z is an ethylene group.

When the polydiorganosiloxane polymer (i) is a fluorinated polydiorganosiloxane, said fluorinated polydiorganosiloxane, may additionally comprise a proportion of up to about 90%, alternatively 80% of the total number of units per molecule of non-fluorinated siloxane units having the formula $(R^4)_cSiO_{(4-c)/2}$ wherein $R^4$ denotes an optionally substituted saturated or unsaturated silicon-bonded, monovalent hydrocarbon group, wherein c=0 to 3 but preferably the average value of c is about 2. Each $R^4$ contains no fluorine (and therefore $R^4$ cannot contain any of the fluoro containing substituents previously identified).

As previously indicated $R^4$ denotes an optionally substituted saturated or unsaturated silicon-bonded, monovalent hydrocarbon group. Preferably each $R^4$ may be the same or different and are selected from $C_1$ to $C_{10}$ alkyl groups; alkenyl groups such as vinyl or allyl groups; and/or aryl groups such as such as phenyl, tolyl, benzyl, beta-phenylethyl, and styryl. Preferably at least two $R^4$ substituents per molecule are alkenyl or alkynyl groups, alternatively alkenyl groups. When present, each alkenyl group will have from 2 to 8 carbon atoms, alternatively each alkenyl group is a vinyl group.

When the polydiorganosiloxane polymer (i) is a fluorinated polydiorganosiloxane, the said fluorinated polydiorganosiloxane may be exemplified by copolymers of dimethylsiloxy units and (3,3,3-trifluoropropyl) methylsiloxy units; copolymers of dimethylsiloxy units, (3,3,3-trifluoropropyl) methylsiloxy units, and vinylmethylsiloxy units; copolymers of (3,3,3-trifluoropropyl)methylsiloxy units and vinylmethylsiloxy units; and poly(3,3,3-trifluouropropyl) methylsiloxane. The terminal group on the molecular chains thereof being selected from a trimethylsiloxy group, vinyldimethylsiloxy group, dimethylhydroxysiloxy group, and (3,3,3-trifluoropropyl)methylhydroxysiloxy group.

The molecular structure of fluorinated polydiorganosiloxane (i) is also typically linear, however, there can be some branching due to the presence of T units (as defined above) within the molecule.

To achieve a useful level of physical properties in the elastomer prepared by curing the composition as hereinbefore described the viscosity of fluorinated polydiorganosiloxanes (i) should be at least 1000 mPa·s at 25° C. relying on the cup/spindle method of ASTM D 1084 Method B, using the most appropriate spindle from the Brookfield® RV or LV range for the viscosity range. The upper limit for the viscosity of fluorinated polydiorganosiloxane (i) is not specifically restricted and is typically limited only by processability if liquid silicone elastomer compositions are desired, However, fluorinated polydiorganosiloxane (i) may also be one or more gums.

A fluorinated polydiorganosiloxane gum (i) typically has a viscosity of at least 1,000,000 mPa·s at 25° C. However, because of the difficulty in measuring viscosity of highly viscous fluids such as silicone gums, the gums tend to be described by way of their Williams plasticity values in accordance with ASTM D-926-08 rather than by viscosity. A fluorinated polydiorganosiloxane gum (i) will also have a viscosity resulting in a Williams's plasticity of at least 30 mm/100 measured in accordance with ASTM D-926-08, alternatively at least 50 mm/100 measured in accordance with ASTM D-926-08, alternatively at least 100 mm/100 measured in accordance with ASTM D-926-08, alternatively from 100 mm/100 to 400 mm/100.

As previously indicated alkenyl and/or alkynyl groups are essential in polydiorganosiloxane polymer (i) typically each molecule will contain at least two alkenyl and/or alkynyl groups but it is important that overall polydiorganosiloxane polymer (i) contains >0 but ≤0.1% wt. of alkenyl groups per component (i) molecule, alternatively from 0.01 to 0.1% wt. Suitable alkenyl radicals in polydiorganosiloxane polymer (i) typically contain from 2 to 10 carbon atoms, preferred examples include but are not limited to vinyl, propenyl, butenyl, pentenyl, hexenyl an alkenylated cyclohexyl group, heptenyl, octenyl, nonenyl, decenyl or similar linear and branched alkenyl groups and alkenylated aromatic ringed structures. Alternatively, the alkenyl group is a vinyl group or a hexenyl group. Alkynyl groups may be selected from but are not limited to ethynyl, propynyl, butynyl, pentynyl, hexynyl an alkynylated cyclohexyl group, heptynyl, octynyl, nonynyl, decynyl or similar linear and branched alkenyl groups and alkenylated aromatic ringed structures. The alkenyl and/or alkynyl content of polymer (i) is determined using quantitative infra-red analysis in accordance with ASTM El 68.

Polydiorganosiloxane polymer (i) is present in a composition as herein before described in an amount of from 50 to 75% by weight of the composition, alternatively from 50 to 70% by weight of the composition alternatively 50 to 65% by weight of the composition.

Polydiorganosiloxane polymer (ii) may have the same general chemical structure and/or viscosity as any of the structures described for polydiorganosiloxane polymer (i) above, however it must contain a much larger content of alkenyl or alkynyl groups i.e. ≥0.5% wt. of alkenyl or alkynyl groups, alternatively ≥0.6% wt., alternatively ≥0.65% wt. of alkenyl or alkynyl groups. The alkenyl and/or alkynyl content of polymer (ii) may also be determined using quantitative infra-red analysis in accordance with ASTM El 68. Typically, the alkenyl or alkynyl groups are alkenyl groups, alternatively alkenyl groups having from 2 to 6 carbons, alternatively vinyl.

Furthermore, it is also essential that polydiorganosiloxane polymer (ii) is only present in the composition in an amount of from 2.5 to 15% by weight of the composition, alternatively from 3.0 to 12.5% by weight of the composition.

Reinforcing Filler (iii)

The composition as herein before described contains a reinforcing filler (iii) such as finely divided silica.

Finely divided forms of silica are preferred as reinforcing filler (iii). Colloidal silicas are particularly preferred because of their relatively high surface area, which is typically at least 50 m$^2$/g. Fillers having surface areas of from 100 to 600 m$^2$/g measured in accordance with the BET method, alternatively of from 100 to 500 m$^2$/g (using the BET method in accordance with ISO 9277: 2010), alternatively of from 200 to 400 m$^2$/g (using the BET method in accordance with ISO 9277: 2010), are typically used. Colloidal silicas can be provided in the form of precipitated or fumed silica. Both types of silica are commercially available.

The amount of finely divided silica or other reinforcing filler used in the compositions described herein is typically from about 10 to 40 weight % of the composition, alternatively 10 to 35 weight % of the composition, alternatively from 15 to 35 weight % of the composition.

When the reinforcing filler(s) is/are naturally hydrophilic (e.g. untreated silica fillers), it/they are typically treated with a treating agent to render them hydrophobic and thereby easier to mix into the polymers (i) and (ii). The fillers may be treated prior to introduction in the composition or in situ (i.e. in the presence of at least a portion of the other components of the composition of the present invention by blending these components together until the filler is completely treated and uniformly dispersed to for a homogeneous material). Typically, untreated filler (iii) is treated in situ with a treating agent in the presence of at least one of polydiorganosiloxane polymers (i) or (ii).

The treating agents used to treat filler (iii) may be selected from one or more of, for example, organosilanes, polydiorganosiloxanes, or organosilazanes, hexaalkyl disilazane, short chain siloxane diols, a fatty acid or a fatty acid ester such as a stearate to render the filler(s) hydrophobic and therefore easier to handle and obtain a homogeneous mixture with the other components. Specific examples include but are not limited to liquid hydroxyl-terminated polydiorganosiloxane containing an average from 2 to 20 repeating units of diorganosiloxane in each molecule which may optionally contain fluoro groups and or fluoro containing groups, if desired, hexaorganodisiloxane, hexaorganodisilazane, and the like. A small amount of water can be added together with the silica treating agent(s) as processing aid. The surface treatment of the fillers makes them easily wetted by polymers (i) and (ii). These surface modified fillers do not clump and can be homogeneously incorporated into polymers (i) and (ii) resulting in improved rheological behavior, such as lower viscosity and stability in viscosity during storage of the uncured compositions and improved room temperature mechanical properties of the cured compositions.

In one preferred embodiment the filler treating agent is a low molecular weight organosilicon compounds disclosed in the art applicable to prevent creping of organosiloxane compositions during processing.

Peroxide Catalyst (iv)

The composition as described herein may be cured with a peroxide catalyst (iv) or mixtures of different types of peroxide catalysts.

The peroxide catalyst may be any of the well-known commercial peroxides used to cure silicone and/or fluorosilicone elastomer compositions. The amount of organic peroxide used is determined by the nature of the curing process, the organic peroxide used, and the composition used. Typically, the amount of peroxide catalyst utilised in a composition as described herein is from 0.2 to 3% wt., alternatively 0.2 to 2% wt. in each case based on the weight of the composition.

Suitable organic peroxides are substituted or unsubstituted dialkyl-, alkylaroyl-, diaroyl-peroxides, e.g. benzoyl peroxide and 2,4-dichlorobenzoyl peroxide, ditertiarybutyl peroxide, dicumyl peroxide, t- butyl cumyl peroxide, bis(t-butylperoxyisopropyl) benzene, bis(t-butylperoxy)-2,5-dimethyl hexyne, 2,4-dimethyl-2,5-di(t- butylperoxy) hexane, di-t-butyl peroxide, and 2,5-bis(tert-butylperoxy)-2,5-dimethylhexane.

Alternatively the composition may be cured using a hydrosilylation catalyst package (v) in the form of
a. an organohydrogenpolysiloxane having at least 2, alternatively at least 3 Si—H groups per molecule; and
b. a hydrosilylation catalyst.

(v)(a) Organohydrogenpolysiloxane

Component (v)(a) is an organohydrogenpolysiloxane, which functions as a cross-linker for curing polymers (i) and (ii), by addition/hydrosilylation reaction of the silicon-bonded hydrogen atoms in component (v)(a) with the alkenyl groups in polymers (i) and (ii) catalysed bycomponent (v)(b) described below. Component (v)(a) normally contains 3 or more silicon-bonded hydrogen atoms so that the hydrogen atoms can react with the unsaturated alkenyl or alkynyl groups of polymers (i) and (ii) to form a network structure therewith and thereby cure the composition. Some or all of organohydrogenpolysiloxane (v)(a) may alternatively have 2 silicon bonded hydrogen atoms per molecule when polymers (i) and (ii) each have >2 alkenyl or alkynyl groups per molecule.

The molecular configuration of component (v)(a) is not specifically restricted, and it can be straight chain, branch-containing straight chain, or cyclic. While the molecular weight of this component is not specifically restricted, the viscosity is typically from 0.001 to 50 Pa·s at 25° C. relying on the cup/spindle method of ASTM D 1084 Method B, using the most appropriate spindle from the Brookfield® RV or LV range for the viscosity range, in order to obtain a good miscibility with polymers (i) and (ii).

Component (v)(a) is typically added in an amount such that the molar ratio of the total number of the silicon-bonded hydrogen atoms in component (v)(a) to the total number of all alkenyl radicals in polymers (i) and (ii) is from 0.5:1 to 20:1. When this ratio is less than 0.5:1, a well-cured composition will not be obtained. When the ratio exceeds 20:1, there is a tendency for the hardness of the cured composition to increase when heated.

Examples of component (v)(a) include but are not limited to:
(i) trimethylsiloxy-terminated methylhydrogenpolysiloxane,
(ii) trimethylsiloxy-terminated polydimethylsiloxane-methylhydrogensiloxane,
(iii) dimethylhydrogensiloxy-terminated dimethylsiloxane-methylhydrogensiloxane copolymers,
(iv) dimethylsiloxane-methylhydrogensiloxane cyclic copolymers,
(v) copolymers composed of $(CH_3)_2HSiO_{1/2}$ units and $SiO_{4/2}$ units,
(vi) copolymers composed of $(CH_3)_3SiO_{1/2}$ units, $(CH_3)_2HSiO_{1/2}$ units, and $SiO_{4/2}$ units; and copolymers containing $(CH_3)_2HSiO_{1/2}$ units and $(R^2Z)_d(R^3)_eSiO_{(4-d-e)/2}$ as described above. Alternatively, component (v)(a) may be a filler, e.g. silica treated with one of the above.

The silicon-bonded hydrogen (Si—H) content of polymer is determined using quantitative infra-red analysis in accordance with ASTM E168. In the present instance the silicon-bonded hydrogen to alkenyl (vinyl) ratio is important when relying on a hydrosilylation cure process. Generally, this is determined by calculating the total weight % of alkenyl groups in the composition, e.g. vinyl [V] and the total weight % of silicon bonded hydrogen [H] in the composition and given the molecular weight of hydrogen is 1 and of vinyl is 27 the molar ratio of silicon bonded hydrogen to vinyl is 27[H]/[V].

(v)(b) Hydrosilylation Catalyst

When present component (v)(b), a hydrosilylation catalyst is preferably one of the platinum metals (platinum, ruthenium, osmium, rhodium, iridium and palladium), or a compound of one or more of such metals. Platinum and platinum compounds are preferred due to the high activity level of these catalysts in hydrosilylation reactions.

Examples of preferred hydrosilylation catalysts (v)(b) include but are not limited to platinum black, platinum on various solid supports, chloroplatinic acids, alcohol solutions of chloroplatinic acid, and complexes of chloroplatinic acid with ethylenically unsaturated compounds such as olefins and organosiloxanes containing ethylenically unsaturated silicon-bonded hydrocarbon groups. The catalyst (v)(b) can be platinum metal, platinum metal deposited on a carrier, such as silica gel or powdered charcoal, or a compound or complex of a platinum group metal.

Examples of suitable platinum-based catalysts include
(i) complexes of chloroplatinic acid with organosiloxanes containing ethylenically unsaturated hydrocarbon groups are described in U.S. Pat. No. 3,419,593;
(ii) chloroplatinic acid, either in hexahydrate form or anhydrous form;
(iii) a platinum-containing catalyst which is obtained by a method comprising reacting chloroplatinic acid with an aliphatically unsaturated organosilicon compound, such as divinyltetramethyldisiloxane;
(iv) alkene-platinum-silyl complexes as described in U.S. Pat. No. 6,605,734 such as $(COD)Pt(SiMeCl_2)_2$ where "COD" is 1,5-cyclooctadiene; and/or
(v) Karstedt's catalyst, a platinum divinyl tetramethyl disiloxane complex typically containing about 1 wt. % of platinum in a solvent, such as toluene may be used. These are described in U.S. Pat. Nos. 3,715,334 and 3,814,730.

The hydrosilylation catalyst (v)(b) when present, is present in the total composition in a catalytic amount, i.e., an amount or quantity sufficient to catalyse the addition/hydrosilylation reaction and cure the composition to an elastomeric material under the desired conditions. Varying levels of the hydrosilylation catalyst (v)(b) can be used to tailor reaction rate and cure kinetics. The catalytic amount of the hydrosilylation catalyst (v)(b) is generally between 0.01 ppm, and 10,000 parts by weight of platinum-group metal, per million parts (ppm), based on the combined weight of the composition polymers (i) and (ii) and filler (iii); alternatively, between 0.01 and 5000 ppm; alternatively, between 0.01 and 3,000 ppm, and alternatively between 0.01 and 1,000 ppm. In specific embodiments, the catalytic amount of the catalyst may range from 0.01 to 1,000 ppm, alternatively 0.01 to 750 ppm, alternatively 0.01 to 500 ppm and alternatively 0.01 to 100 ppm of metal based on the weight of the composition. The ranges may relate solely to the metal content within the catalyst or to the catalyst altogether (including its ligands) as specified, but typically these ranges relate solely to the metal content within the catalyst. The catalyst may be added as a single species or as a mixture of two or more different species. Typically, dependent on the form/concentration in which the catalyst package is provided the amount of catalyst present will be within the range of from 0.001 to 3.0% by weight of the composition.

When the composition as hereinbefore described is being cured via an addition/hydrosilylation reaction component (v) (c) an inhibitor may be utilised to inhibit the cure of the composition. These inhibitors are utilised to prevent premature cure in storage and/or to obtain a longer working time or pot life of a hydrosilylation cured composition by retarding or suppressing the activity of the catalyst. Inhibitors of hydrosilylation catalysts, e.g. platinum metal-based catalysts are well known in the art and may include hydrazines, triazoles, phosphines, mercaptans, organic nitrogen compounds, acetylenic alcohols, silylated acetylenic alcohols, maleates, fumarates, ethylenically or aromatically unsaturated amides, ethylenically unsaturated isocyanates, olefinic siloxanes, unsaturated hydrocarbon monoesters and diesters, conjugated ene-ynes, hydroperoxides, nitriles, and diaziridines.

One class of known inhibitors of platinum catalysts includes the acetylenic compounds disclosed in U.S. Pat. No. 3,445,420. Acetylenic alcohols such as 2-methyl-3-butyn-2-ol constitute a preferred class of inhibitors that will suppress the activity of a platinum-containing catalyst at 25° C. Compositions containing these inhibitors typically require heating at temperature of 70° C. or above to cure at a practical rate.

Examples of acetylenic alcohols and their derivatives include 1-ethynyl-1-cyclohexanol (ETCH), 2-methyl-3-butyn-2-ol, 3-butyn-l-ol, 3-butyn-2-ol, propargyl alcohol, 2-phenyl-2-propyn-1-ol, 3,5-dimethyl-1-hexyn-3-ol, 1-ethynylcyclopentanol, 1-phenyl-2-propynol, 3-methyl-1-penten-4-yn-3-ol, and mixtures thereof.

When present, inhibitor concentrations as low as 1 mole of inhibitor per mole of the metal of catalyst (v)(b) will in some instances impart satisfactory storage stability and cure rate. In other instances, inhibitor concentrations of up to 500 moles of inhibitor per mole of the metal of catalyst (v)(b) are required. The optimum concentration for a given inhibitor in a given composition is readily determined by routine experimentation. Dependent on the concentration and form in which the inhibitor selected is provided/available commercially, when present in the composition, the inhibitor is typically present in an amount of from 0.0125 to 10% by weight of the composition. Mixtures of the above may also be used.

When component (v) is relied upon to cure the composition, typically the composition will be stored in two parts, often referred to as Part A and Part B with a view to separating components (v)(a) and (v)(b) prior to cure to avoid premature cure as will be discussed further below. Such 2-part compositions are composed to enable easy mixing immediately prior to use and are typically in a weight ratio of Part A: Part B of from 15:1 to 1:1.

Additional Optional Components

Additional optional components may be present in the silicone elastomer composition depending on the intended use thereof. Examples of such optional components include compatiblising agents, electrical and thermally conductive fillers, non-conductive fillers, pot life extenders, flame retardants, lubricants, non-reinforcing fillers, pigments coloring agents, adhesion promoters, chain extenders, silicone polyethers, and mixtures thereof.

Further examples of additives include mold release agents, diluents, solvents, UV light stabilizers, bactericides, wetting agents, heat stabilizers, compression set improvement additives, plasticizers, and mixtures thereof.

Compatiblising agents may be introduced into the composition if deemed appropriate to assist in avoidance of phase separation between polymers (i) and (ii). Any suitable agent(s) may be utilised for example block, graft or random copolymers containing dimethylsilicone and methyl trifluoropropyl silicone repeat units different from polymer (ii) such as those described in U.S. Pat. No. 5,824,736.

Electrically conductive fillers may include metal powders e.g. silver nickel and copper and carbonaceous powders such as carbon blacks, graphite powders carbon nanotubes and/or carbon fibres are well known.

Thermally conductive filler may be selected from, but not limited to, the group consisting of aluminum nitride, aluminum oxide, aluminum trihydrate, aluminum oxyhydrate, barium titanate, barium sulfate, beryllium oxide, carbon fibers, diamond, graphite, magnesium hydroxide, magnesium oxide, magnesium oxysulfate fiber, metal particulate, onyx, silicon carbide, tungsten carbide, zinc oxide, coated fillers, and a combination thereof.

Pot life extenders, such as triazole, may be used, but are not considered necessary in the scope of the present invention. The liquid curable silicone elastomer composition may thus be free of pot life extender.

Examples of flame retardants include aluminium trihydrate, chlorinated paraffins, hexabromocyclododecane, triphenyl phosphate, dimethyl methylphosphonate, tris(2,3-dibromopropyl) phosphate (brominated tris), and mixtures or derivatives thereof.

Examples of lubricants include polytetrafluoroethylene (ptfe) resin powder, graphite, fluorinated graphite, talc, boron nitride, molybdenum disulfide, and mixtures or derivatives thereof. In the present disclosure it has also been found that surprisingly further improved results tend to occur when the composition comprises polytetrafluoroethylene having a particle size of from 250 to 750 µm, alternatively 300 to 600 µm alternatively 350 to 550 µm in an amount of from about 0.75 to 5% by weight of the composition. It was found that similar amounts of lower sized polytetrafluoroethylene e.g. having particle sizes of between 1 and 50 µm had a much less positive effect of the coefficient of friction (CoF) of the samples tested. Particle sizes being obtained from supplier datasheets.

Further additives include silicone fluids, such as trimethylsilyl or OH terminated siloxanes. Such trimethylsiloxy or OH terminated polydimethylsiloxanes typically have a viscosity <150 mPa·s at 25° C. relying on the cup/spindle method of ASTM D 1084 Method B, using the most appropriate spindle from the Brookfield® RV or LV range for the viscosity range. When present such silicone fluid may be present in the liquid curable silicone elastomer composition in an amount ranging of from 0.1 to 5% by weight (% wt.), based on the total weight of the composition.

Examples of pigments include but are not limited to titanium dioxide, chromium oxide, bismuth vanadium oxide, iron oxides and mixtures thereof.

Examples of adhesion promoters include but are not limited to alkoxysilane containing methacrylic groups or acrylic groups such as methacryloxymethyl-trimethoxysilane, 3-methacryloxypropyl-tirmethoxysilane, 3-methacryloxypropyl-methyldimethoxysilane, 3-methacryloxypropyl-dimethylmethoxysilane, 3-methacryloxypropyl-triethoxysilane, 3-methacryloxypropyl-methyldiethoxysilane, 3-methacryloxyisobutyl-trimethoxysilane, or a similar methacryloxy-substituted alkoxysilane; 3-acryloxypropyl-trimethoxysilane, 3-acryloxypropyl-methyldimethoxysilane, 3-acryloxypropyl-dimethyl-methoxysilane, 3-acryloxypropyl-triethoxysilane, or a similar acryloxy-substituted alkyl-containing alkoxysilane; zirconium chelate compound such as zirconium (IV) tetraacetyl acetonate, zirconium (IV) hexafluoracetyl acetonate, zirconium (IV) trifluoroacetyl acetonate, tetrakis (ethyltrifluoroacetyl acetonate) zirconium, tetrakis (2,2,6,6-tetramethyl-heptanethionate) zirconium, zirconium (IV) dibutoxy bis(ethylacetonate), diisopropoxy bis (2,2,6,6-tetramethyl-heptanethionate) zirconium, or similar zirconium complexes having β-diketones (including alkyl-substituted and fluoro-substituted forms thereof); epoxy-containing alkoxysilanes such as 3-glycidoxypropyl trimethoxysilane, 3-glycidoxypropyl triethoxysilane, 3-glycidoxypropyl methyldimethoxysilane, 4-glycidoxybutyl trimethoxysilane, 5,6-epoxyhexyl triethoxysilane, 2-(3,4-epoxycyclohexyl) ethyltrimethoxysilane, or 2-(3,4-epoxycyclohexyl) ethyltriethoxysilane.

Examples of chain extenders include but are not limited to disiloxane or a low molecular weight polyorganosiloxane containing two silicon-bonded hydrogen atoms at the terminal positions. The chain extender typically reacts with the alkenyl radicals of polymers (i) and (ii) thereby linking two or more molecules of polymers (i) and (ii) together and increasing its effective molecular weight and the distance between potential cross-linking sites.

A disiloxane is typically represented by the general formula $(HR^a_2Si)_2O$. When the chain extender is a polyorganosiloxane, it has terminal units of the general formula $HR^a_2SiO_{1/2}$ and non-terminal units of the formula $R^b_2SiO$. In these formulae, $R^a$ and $R^b$ individually represent unsubstituted or substituted monovalent hydrocarbon radicals that are free of ethylenic unsaturation and fluoro content, which include, but are not limited to alkyl groups containing from 1 to 10 carbon atoms, substituted alkyl groups containing from 1 to 10 carbon atoms such as chloromethyl, cycloalkyl groups containing from 3 to 10 carbon atoms, aryl containing 6 to 10 carbon atoms, alkaryl groups containing 7 to 10 carbon atoms, such as tolyl and xylyl, and aralkyl groups containing 7 to 10 carbon atoms, such as benzyl.

Further examples of chain extenders include tetramethyldihydrogendisiloxane or dimethylhydrogen-terminated polydimethylsiloxane.

A chain extender may be added in an amount from 1 to 10 parts by weight, based on the weight of polymers (i) and (ii), typically 1 to 10 parts per 100 parts of the combination of polymers (i) and (ii).

Examples of heat stabilizers include metal compounds such as red iron oxide, yellow iron oxide, ferric hydroxide, cerium oxide, cerium hydroxide, lanthanum oxide, copper phthalocyanine. Aluminium hydroxide, fumed titanium dioxide, iron naphthenate, cerium naphthenate, cerium dimethylpolysilanolate and acetylacetone salts of a metal chosen from copper, zinc, aluminum, iron, cerium, zirconium, titanium and the like. The amount of heat stabilizer present in a composition may range from 0.01 to 10% weight of the total composition.

The present invention thus provides a silicone elastomer composition, which comprises: 50 to 75% by weight of one or more polydiorganosiloxane polymer(s) (i) containing from 0.01 to 0.1% wt. of alkenyl groups; 2.5 to 15% by weight of a polydiorganosiloxane polymer (ii) having a vinyl content of ≥0.5% wt. of alkenyl groups (iii) reinforcing filler in an amount of from 10 to 35 weight % of the composition and peroxide (iv) addition/hydrosilylation catalyst package (v) or (vi) a combination of (iv) and (v) as described above.

When the composition is cured via hydrosilylation the composition may comprise 0.5 to 10 weight % of component (v)(a), 0.01 to 1% component (v)(b) and from 0 to 1 weight % of component (v)(c). As discussed above, when cured via hydrosilylation the composition will be stored prior to use in two parts, part A and part B. Typically, part A will contain some of components (i) and (ii), some of Component (iii) and hydrosilylation catalyst (v)(b) and part B will contain the remainder of components (i) and (ii) and filler (iii) together with silicon bonded hydrogen (Si—H) containing cross-linker (v)(a) and (v)(c) inhibitor when present. The two-part composition may be designed to be mixed together in any suitable ratio e.g. to enable easy mixing immediately prior to use and are typically in a weight ratio of Part A:Part B of from 15:1 to 1:1 but in the present instance a ratio of part A:part B of 1 to 1 is generally preferred.

The composition of the present invention may be prepared by combining all of components at ambient or elevated temperature as desired. Any mixing techniques and devices described in the prior art can be used for this purpose. The particular device to be used will be determined dependent on the viscosities of components and the final curable coating composition. Suitable mixers include but are not limited to paddle type mixers and kneader type mixers. Cooling of components during mixing may be desirable to avoid premature curing of the composition.

There is also provided a method of manufacturing a self-lubricating silicone elastomeric material by mixing the components of the composition as described herein. The mixing step may involve mixing all the individual components together or in the presence of component (v) when the composition is in two parts mixing the two parts together. When the composition is in two or more parts, the parts may be mixed together in a multi-part mixing system prior to cure.

The order in which the components of the composition are mixed is not critical in this invention. Polymers (i) and (ii) may be mixed together before the introduction of the other components. Alternatively, a first part A composition containing polymers (i) and (ii), a second part A composition containing polymer (i), a first part B composition containing polydiorganosiloxane polymer (i) and a second part B composition containing polymers (i) and (ii) may all be prepared. Reinforcing filler (iii) may be in any or all these parts, as required and the component (v) components are added as specified above. Immediately prior to use all four parts may then be mixed together in any order in the proportions necessary for the blend or the two part As can be mixed together, the two-part Bs can be mixed together and the Part A mixtures and part B mixtures can subsequently be mixed together as and when required. In an alternative process the various parts may be mixed in the desired ratios immediately before processing by e.g. injection molding using a four-component mixing system.

When the composition herein is designed to be an LSR composition, the viscosity of the composition ranges of from 10 to 1,000 Pa·s, alternatively of from 10 to 500 Pa·s, alternatively of from 100 to 500 Pa·s in each case at 25° C. measured using a cone and plate rheometer at $10^{-1}s$ or relying on Williams plasticity measurements for the most viscous materials e.g. when polymer (i) and/or (ii) is/are gums.

The silicone elastomer composition may, dependent on viscosity and application etc., be further processed by injection moulding, encapsulation moulding, press moulding, dispenser moulding, extrusion moulding, transfer moulding, press vulcanization, centrifugal casting, calendering, bead application or blow moulding.

Curing of the silicone elastomer composition may be carried out as required by the type of cure package utilized. Typical curing temperatures may range of from 80 to 200° C., alternatively of from 100-170° C. The resulting elastomeric materials may be post cured for a suitable period at an appropriate temperature such as, for the sake of example, at 4 hours at 200° C.

Curing can for example take place in a mold to form a moulded silicone article. The composition may for example be injection moulded to form an article, or the composition can be overmoulded by injection moulding around an article or over a substrate. The self-lubricating silicone elastomer composition as described above and the elastomeric material resulting from curing the composition are non-oil bleeding and/or non-oil filled.

The composition as disclosed herein and resulting elastomer provided subsequent to cure of the composition may be utilised for any suitable application requiring a silicone rubber material having a low coefficient of friction. Examples may include straps and bands of wearable devices, e.g. watches and other wearable electronic devices, protection covers for mobile phones and other personal electronic devices, catheters, gaskets and/or seals for healthcare applications, e.g. biomedical applications, wiper blades, connector seals, matt seals, wire seals for e.g. automotive applications, kitchenware, e.g. cake molds, sanitation articles, insulators and/or arresters for high voltage industry.

Hence, there is provided one or more devices selected from straps and bands of wearable devices, protection covers for mobile phones and other personal electronic devices, catheters, gaskets and/or seals for healthcare applications, wiper blades, connector seals, matt seals, wire seals kitchenware, sanitation articles, insulators and/or arresters for high voltage industry which consists or comprises of a self-lubricating silicone rubber elastomer material as herein described.

This present disclosure provides a self-lubricating silicone elastomeric material instead of a surface coating means of lubricating the silicone elastomer or a self-bleeding elastomer product and is designed to provide a long lasting lubricious feel whilst avoiding bleed-out issues for the user and/or wearer of the end product.

Compared with elastomer technology reliant on lubricating powders such as BN, $MoS_2$ etc, the silicone elastomeric materials provided herein is based on an unexpected optimization of commonly used silicone rubber components, not requiring the elastomers to be highly filled with lubricating powders. This maintains the performance of the silicone elastomeric materials and avoids the need to incorporate significant amounts of non-reinforcing fillers which cause significant reductions in the physical mechanical properties of the elastomer e.g. hardness, low tensile strength, elongation and tear strength, etc.) and which increases the density thereof.

When comparing the composition and/or silicone elastomeric material herein with self-bleeding fluid/oil filled elastomers, the compositions/elastomers described herein have the advantage of avoiding the need to incorporate unreactive lubricious liquids designed to bleed-out from the elastomer to create a lubricating coating on the outer surface of the elastomer which can be easily wiped off, and which can be difficult to maintain as a stable self-lubricating outer coating effect during the life cycle of the articles, etc.

Compared with surface coating technology, the composition/silicone elastomeric material described herein provides a homogeneous material with a stable low CoF and as such avoids which will wear off unlike elastomeric material provided with a coating when said coating wears off the surface.

The following examples, illustrating the compositions and components of the compositions, elastomers, and methods, are intended to illustrate and not to limit the invention.

EXAMPLES

A series of comparative examples (C.1-C.2) and examples (Ex.1-Ex.11) supporting the present disclosure were prepared by mixing all the components specified in Tables 1a, 1c and 1e. components (i) and (ii) in these examples were silicone gums (non-fluoro containing). Unless otherwise indicated Williams plasticity for each gum was determined in accordance with ASTM D-926-08. All viscosities were measured at 25° C. relying on the cup/spindle method of ASTM D 1084 Method B, with the most appropriate spindle from the Brookfield® RV or LV range for the viscosity range, unless otherwise indicated. The alkenyl and/or alkynyl and/or silicon bonded hydrogen (Si—H) content of the components was determined using quantitative infra-red analysis in accordance with ASTM E168. Some of the compositions comprise amounts of polytetrafluoroethylene (PTFE). Standard PTFE in the following Tables refer to powdered PTFE having an average particle size (provided by supplier) of about 10 μm. LPS PTFE in the following Table is intended to identify large particle sized PTFE having an average particle size of between 400 and 500 μm.

Coefficient of friction values and other physical property results for the respective compositions/elastomers are shown, together with the test methods used, in Tables 1 b, 1 d and 1f. The static and kinetic coefficient of friction measurements were made using a Labthink MXD-02 machine in accordance with test method (GB/T 10006-1988). These tables provide evidence that compositions as hereinbefore described using gums as polymers (i) and (ii) fall within the scope of this disclosure.

TABLE 1a

Compositions of Gum Comparatives and Examples

| Components | C. 1 | Ex. 1 | C. 2 | Ex. 2 | Ex. 3 |
| --- | --- | --- | --- | --- | --- |
| Dimethylvinyl terminated dimethyl methylvinyl polysiloxane gum having a Williams plasticity 155 mm/100 and a vinyl content of 0.065 wt. % | 36.114 | 31.414 | | | |
| Dimethylvinyl terminated dimethyl polysiloxane gum having a Williams plasticity of 154 mm/100, and a vinyl content of 0.014 wt. % | 36.114 | 31.414 | 64.696 | 63.124 | 55.436 |
| Dimethylvinyl terminated dimethyl methylvinyl polysiloxane gum - Williams plasticity of 135 mm/100 and a vinyl content of 0.7 wt. % | | 9.180 | | | 8.551 |

TABLE 1a-continued

| Compositions of Gum Comparatives and Examples | | | | | |
|---|---|---|---|---|---|
| Components | C. 1 | Ex. 1 | C. 2 | Ex. 2 | Ex. 3 |
| Dimethylvinyl terminated dimethyl methylvinyl polysiloxane, having a viscosity of 150,000 mPa · s and a vinyl content of 7.7 wt. % | | | 1.941 | 1.894 | 1.663 |
| trimethyl terminated dimethyl methylhydrogen polysiloxane, having a viscosity of 5 mPa · s and an Si—H content of 0.776 wt. % | 0.508 | 0.441 | | | 3.337 |
| Treated fumed silica | 26.784 | 26.052 | 32.883 | 32.405 | 28.458 |
| LPS PTFE powder | | 1.040 | | 2.104 | 2.086 |
| DMBPH (2,5-Dimethyl-2,5-di(tert-butylperoxy)hexane) | 0.480 | 0.459 | 0.480 | 0.473 | 0.469 |

The filler(s) and filler treating agent(s) were first mixed with and evenly dispersed into the gum(s) to form a silicone rubber base. The remaining components were then added and dispersed into the base and the final compositions were press cured for 10 minutes at a temperature of 170° C. Some samples were post cured for 4 hours at 200° C. in order to compare coefficient of friction values between non-post cure samples and post cure samples.

TABLE 1b

| Physical Properties of Elastomers made from Compositions of Table 1a | | | | | |
|---|---|---|---|---|---|
| Property | C. 1 | Ex. 1 | C. 2 | Ex. 2 | Ex. 3 |
| Non-Post Cure | | | | | |
| Durometer, Shore A, points (ASTM D2240) | 50 | 46 | 48 | 55 | 52 |
| Tensile strength (MPa) (ASTM D412) | 9.9 | 9.8 | 8.2 | 8.3 | 8.4 |
| Elongation at break, % (ASTM D412) | 574 | 750 | 703 | 729 | 833 |
| Tear strength, kN/m (ASTM D624 Die B) | 23.3 | 32.1 | 32.4 | 32.3 | 39.6 |
| Specific gravity (ASTM D792) | 1.144 | 1.143 | 1.162 | 1.178 | 1.153 |
| Static CoF (GB/T 10006-1988) | 0.540 | 0.406 | 0.574 | 0.531 | 0.566 |
| Kinetic CoF (GB/T 10006-1988) | 1.012 | 0.439 | 1.478 | 0.799 | 0.604 |
| After post cure | | | | | |
| Durometer, Shore A, points (ASTM D2240) | 54 | 51 | 51 | 57 | 55 |
| Tensile strength (MPa) (ASTM D412) | 9.0 | 8.9 | 10.7 | 9.2 | 7.9 |
| Elongation at break, % (ASTM D412) | 455 | 535 | 734 | 730 | 757 |
| Tear strength, kN/m (ASTM D624 Die B) | 16.6 | 20.6 | 37.0 | 36.2 | 43.7 |
| Specific gravity (ASTM D792) | 1.144 | 1.145 | 1.174 | 1.184 | 1.160 |
| Static CoF (GB/T 10006-1988) | 0.540 | 0.537 | 0.495 | 0.512 | 0.557 |
| Kinetic CoF (GB/T 10006-1988) | 1.042 | 0.753 | 0.999 | 0.775 | 0.652 |

It can be seen when comparing comparative composition 1 (C.1) and Example 1 (Ex.1) that the latter shows a much reduced kinetic coefficient of friction showing the difference of only using polymer (i) and both polymer (i) and (ii) with a peroxide cure system and a small amount of LPS PTFE powder, respectively. Comparing C 2 with Ex.2 and Ex.3 it can be seen that the addition of LPS PTFE powder causes a reduction in combination with polymer (i) alone but results show further improvement in the presence of component (ii) as well as the LPS PTFE powder.

Examples in accordance with the disclosure herein were likewise prepared and cured from compositions depicted in Table 1c below.

TABLE 1c

| Compositions of Gum Examples | | | | |
|---|---|---|---|---|
| Components | Ex. 4 | Ex. 5 | Ex. 6 | Ex. 7 |
| Dimethylvinyl terminated dimethyl polysiloxane gum having a Williams plasticity of 154 mm/100, and a vinyl content of 0.014 wt. % | 60.009 | 59.397 | 59.397 | 58.795 |
| Dimethylvinyl terminated dimethyl methylvinyl polysiloxane gum - Williams plasticity of 135 mm/100 and a vinyl content of 0.7 wt. % | 8.484 | 8.397 | 8.397 | 8.312 |

TABLE 1c-continued

Compositions of Gum Examples

| Components | Ex. 4 | Ex. 5 | Ex. 6 | Ex. 7 |
|---|---|---|---|---|
| trimethyl terminated dimethyl methylhydrogen polysiloxane, having a viscosity of 5 mPa · s and an Si—H content of 0.776 wt. % | 3.311 | 3.277 | 3.277 | 3.244 |
| Treated fumed silica | 27.730 | 27.444 | 27.444 | 27.166 |
| Standard PTFE | | 1.024 | | |
| LPS PTFE powder | | | 1.024 | 2.027 |
| DMBPH (2,5-Dimethyl-2,5-di(tert-butylperoxy)hexane) | 0.466 | 0.461 | 0.461 | 0.456 |

Physical properties of the resulting elastomers were determined and are depicted in Table 1d below.

TABLE 1d

Physical Properties of Elastomers made from Compositions of Table 1c

| Property | Ex. 4 | Ex. 5 | Ex. 6 | Ex. 7 |
|---|---|---|---|---|
| Non-Post Cure | | | | |
| Durometer, Shore A, points (ASTM D2240) | 60 | 61 | 62 | 65 |
| Tensile strength (MPa) (ASTM D412) | 10.5 | 10.4 | 9.2 | 9.3 |
| Elongation at break, % (ASTM D412) | 634 | 589 | 637 | 610 |
| Tear strength, kN/m (ASTM D624 Die B) | 49.4 | 48.2 | 48.7 | 51.6 |
| Specific gravity (ASTM D792) | 1.147 | 1.149 | 1.148 | 1.16 |
| Static CoF (GB/T 10006-1988) | 0.523 | 0.535 | 0.452 | 0.532 |
| Kinetic CoF (GB/T 10006-1988) | 0.764 | 0.801 | 0.462 | 0.511 |
| After post cure | | | | |
| Durometer, Shore A, points (ASTM D2240) | 61 | 62 | 63 | 65 |
| Tensile strength (MPa) (ASTM D412) | 10.3 | 10.2 | 9.0 | 9.2 |
| Elongation at break, % (ASTM D412) | 604 | 570 | 603 | 534 |
| Tear strength, kN/m (ASTM D624 Die B) | 49.7 | 48.8 | 43.0 | 51.8 |
| Specific gravity (ASTM D792) | 1.155 | 1.157 | 1.157 | 1.16 |
| Static CoF (GB/T 10006-1988) | 0.519 | 0.511 | 0.466 | 0.356 |
| Kinetic CoF (GB/T 10006-1988) | 0.719 | 0.701 | 0.492 | 0.305 |

Comparisons of E4 and E5 with Ex. 6 and 7 show that the coefficient of friction results are further improved by the addition of PTFE, in particular the LPS PTFE powder.

Further examples in accordance with the disclosure herein were likewise prepared and cured from compositions depicted in Table 1e below.

TABLE 1e

Compositions of Gum Examples

| Components | Ex. 8 | Ex. 9 | Ex. 10 | Ex. 11 |
|---|---|---|---|---|
| Dimethylvinyl terminated dimethyl polysiloxane gum having a Williams plasticity of 154 mm/100 and a vinyl content of 0.014 wt. % | 60.2861 | 59.0579 | 58.4650 | 59.6677 |
| Dimethylvinyl terminated dimethyl methylvinyl polysiloxane gum having a Williams plasticity of 135 mm/100 and a vinyl content of 0.7 wt. % | 8.5234 | 8.3499 | 8.2652 | 8.4353 |
| Dimethylvinyl terminated dimethyl methylvinyl polysiloxane having a viscosity of 150,000 mPa · s, and a vinyl content of 7.7 wt. % | | | | |
| trimethyl terminated dimethyl methylhydrogen polysiloxane having a viscosity of viscosity5 mPa · s and an Si—H content of 0.776 wt. % | 3.3262 | 3.2585 | 3.2255 | 3.2918 |
| Treated fumed silica | 27.8569 | 27.2899 | 27.0132 | 27.5692 |
| LPS PTFE powder | | 2.0366 | 3.0239 | 1.0287 |
| 1,3-Diethenyl-1,1,3,3-Tetramethyldisiloxane Complexes (Platinum) | 0.0004 | 0.0004 | 0.0004 | 0.0004 |
| Ethynyl-1-cyclohexanol (ETCH) | 0.0070 | 0.0068 | 0.0068 | 0.0069 |

Physical properties of the resulting elastomers were determined and are depicted in Table 1f below.

TABLE 1f

Physical Properties of Elastomers made from Compositions of Table 1e

| Property | Ex. 8 | Ex. 9 | Ex. 10 | Ex. 11 |
|---|---|---|---|---|
| Non-Post Cure | | | | |
| Durometer, Shore A, points (ASTM D2240) | 46 | 51 | 56 | 50 |
| Tensile strength (MPa) (ASTM D412) | 5.1 | 4.0 | 3.7 | 3.7 |
| Elongation at break, % (ASTM D412) | 854 | 855 | 806 | 696 |
| Tear strength, kN/m (ASTM D624 Die B) | 30.4 | 31 | 33.2 | 27.4 |
| Specific gravity (ASTM D792) | 1.15 | 1.16 | 1.16 | 1.15 |
| Static CoF (GB/T 10006-1988) | 0.29 | 0.343 | 0.338 | 0.489 |
| Kinetic CoF (GB/T 10006-1988) | 0.286 | 0.315 | 0.357 | 0.37 |
| After post-cure | | | | |
| Durometer, Shore A, points (ASTM D2240) | 60 | 63 | 67 | 62 |
| Tensile strength (MPa) (ASTM D412) | 7.4 | 7.1 | 7.1 | 8.1 |
| Elongation at break, % (ASTM D412) | 775 | 678 | 704 | 781 |
| Tear strength, kN/m (ASTM D624 Die B) | 48.4 | 40.9 | 43.3 | 43.5 |
| Specific gravity (ASTM D792) | 1.15 | 1.16 | 1.17 | 1.16 |
| Static CoF (GB/T 10006-1988) | 0.36 | 0.221 | 0.181 | 0.231 |
| Kinetic CoF (GB/T 10006-1988) | 0.357 | 0.243 | 0.175 | 0.241 |

E8~E11 show the synergetic effect identified herein between special construct of the polymers with hydrosilylation cure system and the added LPS PTFE powder in reducing CoF.

It can be seen that generally the kinetic coefficient of friction results are quite significantly lower than comparatives in Tables 1a/1b. Of particular note is that the peroxide curing agent used in previous examples had been replaced by a component (v) addition cure package and the coefficient of friction results were even lower using said package to cure the elastomer.

A series of fluorinated organopolysiloxane composition were prepared in accordance with the disclosure. The composition utilised are depicted in Table 2a and 2c and the respective physical properties are depicted in Tables 2b and 2d below.

TABLE 2a

Compositions of Fluorosilicone Comparatives and Examples

| Components | C. 3 | C. 4 | C. 5 | Ex. 12 |
|---|---|---|---|---|
| Dimethylhydroxy trifluoropropylmethyl Siloxane gum having a Williams plasticity of 299 mm/100 | | | 59.715 | |
| Dimethylhydroxy terminated methylvinyl, trifluoropropylmethyl Siloxane gum having a Williams plasticity of 284 mm/100, and a vinyl content of 0.0996 wt. % | 12.827 | 67.754 | 13.432 | |
| Dimethylhydroxy terminated methylvinyl, trifluoropropylmethyl Siloxane gum - having a Williams plasticity of 330 mm/100, and a vinyl content of 1.37 wt. % | | | | 3.803 |
| Dimethylhydroxy terminated trifluoropropylmethyl Siloxane gum having a Williams plasticity of 330 mm/100, | 57.693 | | | |
| Dimethylhydroxy terminated methylvinyl, trifluoropropylmethyl Siloxane gum having a Williams plasticity of 284 mm/100, and a vinyl content of 0.0996 wt. % | | | | 65.206 |
| Trimethyl terminated dimethylmethylhydrogensiloxane having a viscosity of 15 mPa · s and an Si—H content of 0.838 wt. % | | | | 2.425 |
| LPS PTFE powder | | 1.987 | 2.030 | 1.941 |
| Treated Fumed silica | 29.016 | 29.812 | 24.366 | 26.188 |
| DMBPH (2,5-Dimethyl-2,5-di(tert-butylperoxy)hexane) | 0.464 | 0.447 | 0.457 | |
| DCBP (Bis(2,4-Dichloro Benzoyl) Peroxide) | | | | 0.437 |

Physical properties of the resulting elastomers were determined and are depicted in Table 2b below. Physical properties were measured using the same methods as described above and/or indicated in the Table below.

TABLE 2b

Physical Properties of Elastomers made from Compositions of Table 2a

| Property | C. 3 | C. 4 | C. 5 | Ex. 12 |
|---|---|---|---|---|
| Non-Post Cure | | | | |
| Static CoF (GB/T 10006-1988) | 0.59 | 0.56 | 0.53 | 0.56 |
| Kinetic CoF (GB/T 10006-1988) | 1.71 | 1.64 | 1.71 | 0.73 |
| After Post Cure | | | | |
| Durometer, Shore A, points (ASTM D2240) | 57 | 50 | 45 | 50 |
| Tensile strength (MPa) (ASTM D412) | 9.4 | 8.1 | 6.2 | 7.7 |
| Elongation at break, % (ASTM D412) | 310 | 436 | 369 | 421 |
| Tear strength, kN/m (ASTM D624 Die B) | 15.7 | 42.7 | 18.2 | 25.8 |
| Specific gravity (ASTM D792) | 1.430 | 1.459 | 1.440 | 1.424 |
| Static CoF post (GB/T 10006-1988) | 0.59 | 0.55 | 0.55 | 0.57 |
| Kinetic CoF post (GB/T 10006-1988) | 1.76 | 1.50 | 1.51 | 1.00 |

Again it can be seen that the kinetic coefficient of friction of example 12 give much lower results than do the comparatives in the above table.

A further series of fluorinated organopolysiloxane composition were prepared in accordance with the disclosure and are depicted in Table 2c below.

TABLE 2c

Compositions of Fluorosilicone Comparatives and Examples

| Component | Ex. 13 | Ex. 14 | C. 6 | Ex. 15 | Ex. 16 |
|---|---|---|---|---|---|
| Dimethylhydroxy terminated methylvinyl, trifluoropropylmethyl Siloxane gum having a Williams plasticity of 284 mm/100, and a vinyl content of 0.0996 wt. % | | | | | |
| Dimethylhydroxy terminated methylvinyl, trifluoropropylmethyl Siloxane gum - having a Williams plasticity of 330 mm/100, and a vinyl content of 1.37 wt. % | 3.803 | 3.9953 | 3.9954 | 3.898 | 3.5639 |
| Dimethylhydroxy terminated methylvinyl, trifluoropropylmethyl Siloxane gum having a Williams plasticity of 284 mm/100, and a vinyl content of 0.0996 wt. % | 65.206 | 66.0290 | 66.9557 | 64.419 | 61.0980 |
| Trimethyl terminated dimethylmethylhydrogensiloxane having a viscosity of 15 mPa · s and an Si—H content of 0.838 wt. % | 2.425 | | | | |
| LPS PTFE powder | 1.941 | | | 1.989 | 1.9759 |
| Treated Fumed silica | 26.188 | 27.5087 | 27.5093 | 26.840 | 25.5130 |
| DMBPH (2,5-Dimethyl-2,5-di(tert-butylperoxy)hexane) | 0.437 | | | 0.447 | 0.4446 |
| 1,3-Diethenyl-1,1,3,3 - Tetramethyldisiloxane Complexes (Platinum) | | 0.0005 | 0.0005 | | 0.0027 |
| Dimethylhydrogensiloxy-terminated Trifluoropropyl Silsesquioxane | | 2.4665 | | 2.407 | 2.4622 |
| Dimethylhydrogensiloxy-Modified Silica | | | 1.5391 | | |
| Trimethyl terminated polydimethylsiloxane viscosity 100 mPa · s | | | | | 4.9397 |

Physical properties of the resulting elastomers were determined and are depicted in Table 2d below.

Table 2d

Physical Properties of Elastomers made from Compositions of Table 2c

| Property | Ex. 13 | Ex. 14 | C. 6 | Ex. 15 | Ex. 16 |
|---|---|---|---|---|---|
| Non-Post Cure | | | | | |
| Static CoF non-post (GB/T 10006-1988) | 0.48 | 0.56 | 0.57 | 0.56 | 0.25 |
| Kinetic CoF non-post (GB/T 10006-1988) | 0.66 | 1.52 | 1.41 | 0.83 | 0.29 |

Table 2d-continued

Physical Properties of Elastomers made from Compositions of Table 2c

| Property | Ex. 13 | Ex. 14 | C. 6 | Ex. 15 | Ex. 16 |
|---|---|---|---|---|---|
| After post cure | | | | | |
| Durometer, Shore A, points (ASTM D2240) | 70 | 59 | 52 | 63 | 67 |
| Tensile strength (MPa) (ASTM D412) | 7.3 | 9.6 | 6.7 | 9.4 | 6.1 |
| Elongation at break, % (ASTM D412) | 191 | 426 | 559 | 350 | 192 |
| Tear strength, kN/m (ASTM D624 Die B) | 15.2 | 36.7 | 29.3 | 34.7 | 22.4 |
| Specific gravity (ASTM D792) | 1.427 | NA | NA | 1.434 | 1.395 |
| Static CoF post (GB/T 10006-1988) | 0.57 | 0.55 | 0.56 | 0.49 | 0.20 |
| Kinetic CoF post (GB/T 10006-1988) | 1.20 | 0.91 | 1.36 | 0.80 | 0.22 |

Comparing in particular C3~C5 and E12 from Table 2b and E13 in Tables 2c and d, it will be appreciated that a synergistic effect is evident not only when the Component (ii) is present but this is enhanced in combination with LPS PTFE powder. Again it can be seen that the kinetic coefficient of friction of the compositions in accordance with the disclosure give much lower results than do the comparatives in the above table.
Comparing between E15~16 and C6 and it can be seen that it is advantageous to utilise a fluoro containing cross-linker for fluorosilicone examples provided above. Again, it can also be seen that the CoF values are improved by the addition of LPS PTFE powder especially for Ex. 16 but that in the case of Ex. 14 very good results are achieved in the absence of ptfe.

A series of liquid silicone rubber (LSR) compositions in accordance with the enclosed was also prepared and are depicted in Table 3a and 3b below. Table 3a depicts two masterbatches prepared for use in the 2-part LSR compositions described in Table 3b.

TABLE 3a

Masterbatch bases for LSR composition

| | MB 1 (wt. %) | MB 2 (wt. %) |
|---|---|---|
| Dimethylvinyl terminated dimethyl Siloxane having a viscosity of 55,000 mPa · s and a vinyl content of 0.09 wt. % | 62.14 | 50.82 |
| Dimethylvinyl terminated dimethyl methylvinyl Siloxane having a viscosity of 12967 mPa · s and a vinyl content of 7.71 wt. % | | 8.00 |
| treated fumed silica having a BET surface area of about 300 m²/g | 37.86 | 41.18 |
| Total | 100 | 100 |

Compositions were prepared and stored in two parts (Part A and Part B) to avoid premature cure. In the case of both C.7 and Ex. 17a platinum catalyst was incorporated in the part A composition and an Si—H containing cross-linker and inhibitor were both present in the Part B composition. The two parts were mixed in a 1:1 ratio immediately before application and cure. The composition was cured at a temperature of 150° C. for 5 minutes and for some samples are post cured for 4 hours at 200° C.

Table 3b

Compositions of LSR Comparative and Example

| Components | C. 7 Part A | C. 7 Part B | Ex. 17 Part A | Ex. 17 Part B |
|---|---|---|---|---|
| MB 1 | 85.89 | 82.09 | | |
| MB 2 | | | 83.67 | 86.49 |
| Dimethylvinyl terminated dimethyl Siloxane having a viscosity of 55,000 mPa · s and a vinyl content of 0.09 wt. % | 8.15 | 7.25 | 4.75 | |
| Dimethyl, Methylvinyl Siloxane, Dimethylvinylsiloxy-terminated 350 mPa · s and a vinyl content of 1.15 wt. % | 6.02 | 4.51 | 11.42 | 0.00 |
| Platinum catalyst | 0.20 | | 0.16 | |
| Ethynyl-1-cyclohexanol (ETCH) in Dimethylvinylsiloxy-terminated Dimethyl, Methylvinyl Siloxane, 350 mPa · s and a vinyl content of 1.15 wt. % | | 1.60 | | 2.42 |
| Tetramethyltetravinylcyclotetrasiloxane | 0.14 | | | |
| Trimethylsiloxy-terminated Dimethyl, Methylhydrogen Siloxane having a viscosity of 48 mPa · s and an Si—H content of 0.72 wt. % | | 4.55 | 0 | 7.79 |
| Trimethylsiloxy terminated methylhydrogen Siloxane, viscosity 30 mPa · s and an Si—H content of 1.57% | | | 0 | 3.30 |
| Total dosage | 100.00 | 100.00 | 100.00 | 100.00 |

Physical properties of the resulting elastomers were determined and are depicted in Table 3c below.

TABLE 3c

Physical Properties of Elastomers made from Compositions of Table 2c

| Property | C. 7 | Ex. 17 |
|---|---|---|
| Press cure 150° C. for 5 min | | |
| Durometer, Shore A, points (ASTM D2240) | 58 | 83 |
| Tensile strength (MPa) (ASTM D412) | 10.5 | 7.11 |
| Elongation at break, % (ASTM D412) | 464 | 123 |
| Tear strength, kN/m (ASTM D624 Die B) | 38.8 | 8.2 |
| Specific gravity (ASTM D792) | 1.123 | 1.152 |
| Static CoF (GB/T 10006-1988) | 0.553 | 0.354 |
| Kinetic CoF (GB/T 10006-1988) | 1.496 | 0.760 |
| After post cure 200° C. for 4 hours | | |
| Durometer, Shore A, points (ASTM D2240) | 64 | 87 |
| Tensile strength (MPa) (ASTM D412) | 9.74 | 7.31 |
| Elongation at break, % (ASTM D412) | 342 | 46.8 |
| Tear strength, kN/m (ASTM D624 Die B) | 38.5 | 4.7 |
| Specific gravity (ASTM D792) | 1.125 | 1.151 |
| Static CoF (GB/T 10006-1988) | 0.525 | 0.097 |
| Kinetic CoF (GB/T 10006-1988) | 1.227 | 0.155 |

Again it can be seen that the kinetic coefficient of friction of the composition of Ex. 17 is much lower than the kinetic coefficient of friction of C.7, due to the combination of components (i) and (ii) as hereinbefore described with the differing vinyl content together with a hydrosilylation cure package as compared to C.7 which only contains component (i) as hereinbefore described in the composition. In this instance no ptfe was present.

What is claimed is:

1. A self-lubricating silicone elastomer composition, comprising:
    (i) 50 to 75% by weight of one or more polydiorganosiloxane polymer(s) containing from 0.01 to 0.1% by weight of alkenyl content;
    (ii) 3 to 15% by weight of a polydiorganosiloxane polymer having ≥0.5% by weight of alkenyl content;
    (iii) 10 to 35% by weight of reinforcing filler; and either
    (iv) a peroxide catalyst; or
    (v) a hydrosilylation catalyst package comprising
        (a) a polydiorganosiloxane polymer having at least 2 Si-H groups per molecule; and
        (b) a hydrosilylation catalyst; or
    (vi) a combination of (iv) and (v); and
    further comprising:
    (vii) polytetrafluoroethylene;
        wherein components (i) and (ii) comprise fluorosilicone gums, the self-lubricating silicone elastomer composition is hydrosilylation curable, and the polydiorganosiloxane polymer (v) (a) is fluoro containing.

2. The self-lubricating silicone elastomer composition in accordance with claim 1, wherein each of components (i) and (ii) have a Williams plasticity of >30 mm/100 in accordance with ASTM D-926-08.

3. The self-lubricating silicone elastomer composition in accordance with claim 2, wherein each of components (i) and (ii) have a Williams plasticity of from 100 mm/100 to 400 mm/100 in accordance with ASTM D-926-08.

4. The self-lubricating silicone elastomer composition in accordance with claim 1, wherein the polytetrafluoroethylene (vii) is present in an amount of from 0.75 to 5% by weight.

5. The self-lubricating silicone elastomer composition in accordance with claim 1, wherein the reinforcing filler (iii) is a treated fumed silica, precipitated silica, silica aerogel or a mixture thereof.

6. The self-lubricating silicone elastomer composition in accordance with claim 1, wherein when component (v) is present there is additionally provided a hydrosilylation cure inhibitor in an amount of from 0 to 1% by weight of the composition.

7. The self-lubricating silicone elastomer composition in accordance with claim 1, wherein when component (v) is present, the composition is stored in two parts, a first part, Part A, comprising components (i), (iii) and (v) (b) and a second part, Part B, which comprises components (i), (iii), and (v) (a), and wherein component (ii) is present in Part A, or Part B, or divided between Part A and Part B.

8. The self-lubricating silicone elastomer composition in accordance with claim 1, wherein the polytetrafluoroethylene (vii) has a particle size of from 250 to 750 μm.

9. The self-lubricating silicone elastomer composition in accordance with claim 8, comprising polytetrafluoroethylene (vii) having a particle size of from 350 to 550 μm.

10. The self-lubricating silicone elastomer composition in accordance with claim 9, wherein the polytetrafluoroethylene (vii) is present in an amount of from 0.75 to 5% by weight.

11. The self-lubricating silicone elastomer composition in accordance with claim 9, comprising polytetrafluoroethylene (vii) having an average particle size of between 400 and 500 μm.

12. The self-lubricating silicone elastomer composition in accordance with claim 1, which is non-oil bleeding and/or non-oil filled.

13. The self-lubricating silicone elastomer composition in accordance with claim 1, further comprising one or more of compatibilising agents, electrical and thermally conductive fillers, non-conductive fillers, pot life extenders, flame retardants, non-reinforcing fillers, pigments, coloring agents, adhesion promoters, chain extenders, silicone polyethers, and mixtures thereof.

14. The self-lubricating silicone elastomer composition in accordance with claim 1, wherein component (v) (a) is a polydiorganosiloxane polymer having at least 3 Si-H groups per molecule.

15. The self-lubricating silicone elastomer composition in accordance with claim 1, wherein components (i) and (ii) each include vinyl groups.

16. A self-lubricating silicone elastomeric material which is the cured product of the composition in accordance with claim 1.

17. The self-lubricating silicone elastomeric material in accordance with claim 16, having a post cured kinetic coefficient of friction of >0 and ≤0.8 or having a post cured kinetic coefficient of friction of >0 and ≤1.25 in the case of a fluorosilicone elastomeric material.

18. The self-lubricating silicone elastomeric material in accordance with claim 16, adapted for use in straps and bands of wearable devices, protection covers for mobile phones and other personal electronic devices, catheters, gaskets and/or seals for healthcare applications, wiper blades, connector seals, matt seals, wire seals kitchenware, sanitation articles, insulators and/or arresters for high voltage industry.

19. A device selected from straps and bands of wearable devices, protection covers for mobile phones and other personal electronic devices, catheters, gaskets and/or seals for healthcare applications, wiper blades, connector seals, matt seals, wire seals kitchenware, sanitation articles, insulators and/or arresters for high voltage industry, which consists or comprises of the self-lubricating silicone rubber elastomer material in accordance with claim 16.

20. A method of manufacturing a self-lubricating silicone elastomeric material, comprising mixing the components of the self-lubricating silicone elastomer composition in accordance with claim 1 and curing the composition.

\* \* \* \* \*